United States Patent
Fu et al.

(10) Patent No.: US 9,587,627 B2
(45) Date of Patent: Mar. 7, 2017

(54) CONTROL SYSTEM AND METHOD FOR MITIGATING ROTOR IMBALANCE ON A WIND TURBINE

(71) Applicant: General Electric Company, Schenectady, NY (US)

(72) Inventors: Xu Fu, Shanghai (CN); Na Ni, Shanghai (CN); Qiang Li, Shanghai (CN); Zhilin Wu, Shanghai (CN); Lihan He, Shanghai (CN); Hai Qiu, Shanghai (CN); Yong Yang, Shanghai (CN); Gerald Addison Curtin, Jr., Niskayuna, NY (US); Myungkeun Yoon, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 775 days.

(21) Appl. No.: 13/932,692

(22) Filed: Jul. 1, 2013

(65) Prior Publication Data
US 2014/0037448 A1    Feb. 6, 2014

(30) Foreign Application Priority Data
Aug. 2, 2012    (CN) .......................... 2012 1 0273836

(51) Int. Cl.
*F03D 7/02*    (2006.01)
(52) U.S. Cl.
CPC ........... *F03D 7/0224* (2013.01); *F03D 80/00* (2016.05); *F05B 2260/96* (2013.01); *Y02E 10/722* (2013.01); *Y02E 10/723* (2013.01)
(58) Field of Classification Search
None
See application file for complete search history.

(56) References Cited

U.S. PATENT DOCUMENTS

| 6,769,873 | B2 | 8/2004 | Beauchamp et al. |
| 6,940,186 | B2 | 9/2005 | Weitkamp et al. |

(Continued)

FOREIGN PATENT DOCUMENTS

| CN | 101578450 A | 11/2009 |
| CN | 102182633 A | 9/2011 |

(Continued)

OTHER PUBLICATIONS

Unofficial English translation of Office Action issued in connection with corresponding CN Application No. 201210273836.X on Jun. 24, 2015.

*Primary Examiner* — Igor Kershteyn
*Assistant Examiner* — Justin Seabe
(74) *Attorney, Agent, or Firm* — GE Global Patent Operation; Douglas D. Zhang

(57) ABSTRACT

A wind turbine includes multiple blades, multiple Micro Inertial Measurement Units (MIMUs) for sensing parameter signals of the blades, and a control system. The control system includes a blade bending moment calculation unit, a blade bending moment error signal calculation unit, and a pitch angle compensation command calculation unit. The blade bending moment calculation unit is used for calculating blade bending moment values of the blades based at least on the sensed parameters. The blade bending moment error signal calculation unit is used for calculating blade bending moment error signals of the blades based on the calculated blade bending moment values of the blades and multiple blade bending moment commands. The pitch angle compensation command calculation unit is used for calculating pitch angle compensation commands of the blades based on the calculated blade bending moment error signals to adjust pitch angles of the blades respectively.

9 Claims, 9 Drawing Sheets

(56) References Cited

U.S. PATENT DOCUMENTS

| | | |
|---|---|---|
| 7,322,794 B2 | 1/2008 | LeMieux et al. |
| 7,822,560 B2 | 10/2010 | LeMieux et al. |
| 8,123,478 B2 | 2/2012 | Ahman et al. |
| 8,249,754 B2 | 8/2012 | Hayashi et al. |
| 2009/0246019 A1 | 10/2009 | Volanthen et al. |
| 2010/0283246 A1* | 11/2010 | Christensen .......... F03D 7/0292 290/44 |
| 2011/0150649 A1 | 6/2011 | Adams et al. |
| 2011/0158806 A1* | 6/2011 | Arms .................... F03D 1/0658 416/31 |
| 2011/0229300 A1 | 9/2011 | Kanev et al. |
| 2011/0268570 A1 | 11/2011 | Dey et al. |
| 2012/0061962 A1* | 3/2012 | Nagasaki .............. F03D 7/0224 290/44 |
| 2012/0091713 A1* | 4/2012 | Egedal .................. F03D 7/0224 290/44 |
| 2012/0128488 A1* | 5/2012 | Kristoffersen ........ F03D 7/0224 416/31 |
| 2012/0169053 A1* | 7/2012 | Tchoryk, Jr. .............. G01P 5/26 290/44 |
| 2013/0272874 A1* | 10/2013 | Hess .................... F03D 7/0224 416/1 |

FOREIGN PATENT DOCUMENTS

| | | | |
|---|---|---|---|
| DE | 102009022236 A1 | 11/2010 | |
| DE | WO 2012019675 A2 * | 2/2012 | ........... F03D 7/0224 |
| GB | 2461532 | 6/2010 | |
| WO | 2010/049736 | 5/2010 | |

* cited by examiner

CONTROL SYSTEM AND METHOD FOR MITIGATING ROTOR IMBALANCE ON A WIND TURBINE

BACKGROUND

Embodiments of the disclosure relate generally to wind turbines and, more particularly, relate to mitigating rotor imbalance on wind turbines.

A utility-scale wind turbine typically includes a set of two or three large rotor blades mounted to a hub. The rotor blades and the hub together are referred to as the rotor. The rotor blades aerodynamically interact with the wind and create lift and drag, which is then translated into a driving torque by the rotor. The rotor is attached to and drives a main shaft, which in turn is operatively connected via a drive train to a generator or a set of generators that produce electric power. The main shaft, the drive train, and the generator(s) are all situated within a nacelle, which rests on a yaw system that in some embodiments continuously pivots along a vertical axis to keep the rotor blades facing in the direction of the prevailing wind current to generate maximum driving torque.

In certain circumstances, the wind direction can shift very rapidly, faster than the response of the yaw system, which can result in a yaw error which can generate rotor imbalance (or load imbalance). The rotor imbalance is due to wind shear or yaw misalignment on the operational wind turbines. During such aforementioned transient wind events, the rotor imbalance, which can be sustained for a few seconds or minutes, might damage the wind turbine if operation of the wind turbine continues. Specifically, during such operation of the wind turbine, rotor imbalance can result in unacceptably high loads on the rotor blades, hub, tower, and other components thereof, which can result in damage.

Therefore, there is a need for new and improved control systems and methods for mitigating rotor imbalance on wind turbines.

BRIEF DESCRIPTION

A wind turbine is provided. The wind turbine includes multiple blades, multiple Micro Inertial Measurement Units (MIMUs) for sensing parameter signals of the blades, and a control system. The control system includes a blade bending moment calculation unit, a blade bending moment error signal calculation unit, and a pitch angle compensation command calculation unit. The blade bending moment calculation unit is used for calculating blade bending moment values of the blades based at least on the sensed parameters. The blade bending moment error signal calculation unit is used for calculating blade bending moment error signals of the blades based on the calculated blade bending moment values of the blades and multiple blade bending moment commands. The pitch angle compensation command calculation unit is used for calculating pitch angle compensation commands of the blades based on the calculated blade bending moment error signals to adjust pitch angles of the blades respectively.

A control method for mitigating rotor imbalance on a wind turbine is provided. The control method includes sensing parameter signals of the plurality of blades through a plurality of Micro Inertial Measurement Units (MIMUs); calculating blade bending moment values of the plurality of blades based at least on the sensed parameters; calculating blade bending moment error signals of the plurality of blades based on the calculated blade bending moment values of the plurality of blades and a plurality of blade bending moment commands; calculating pitch angle compensation commands of the plurality of blades based on the calculated blade bending moment error signals; and using the pitch angle compensation commands to adjust pitch angles of the plurality of blades.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments disclosed herein relate generally to wind turbines with improved rotor imbalance compensation capabilities. As used herein, "Micro Inertial Measurement Unit (MIMU)" refers to a motion capture sensing apparatus, which can sense three dimensional (3D) orientation (pitch, roll, yaw) signals, 3D acceleration signals, 3D rate of turn signals, 3D magnetic field signals, and/or other related parameter signals in real time. The MIMUs may include at least of or any combination of a 3D accelerometer, a 3D gyroscope, and a 3D magnetometer.

The exemplary embodiments of the improved rotor imbalance compensation capabilities described herein are based on control systems and methods which can produce pitch angle compensation commands used to compensate the generated rotor imbalance during yaw error events or due to stationary wind shear, abrupt and/or severe wind gust or wake events. The pitch angle compensation commands are calculated based on at least the sensed parameter signals from the MIMUs mounted on the blades of the wind turbine.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
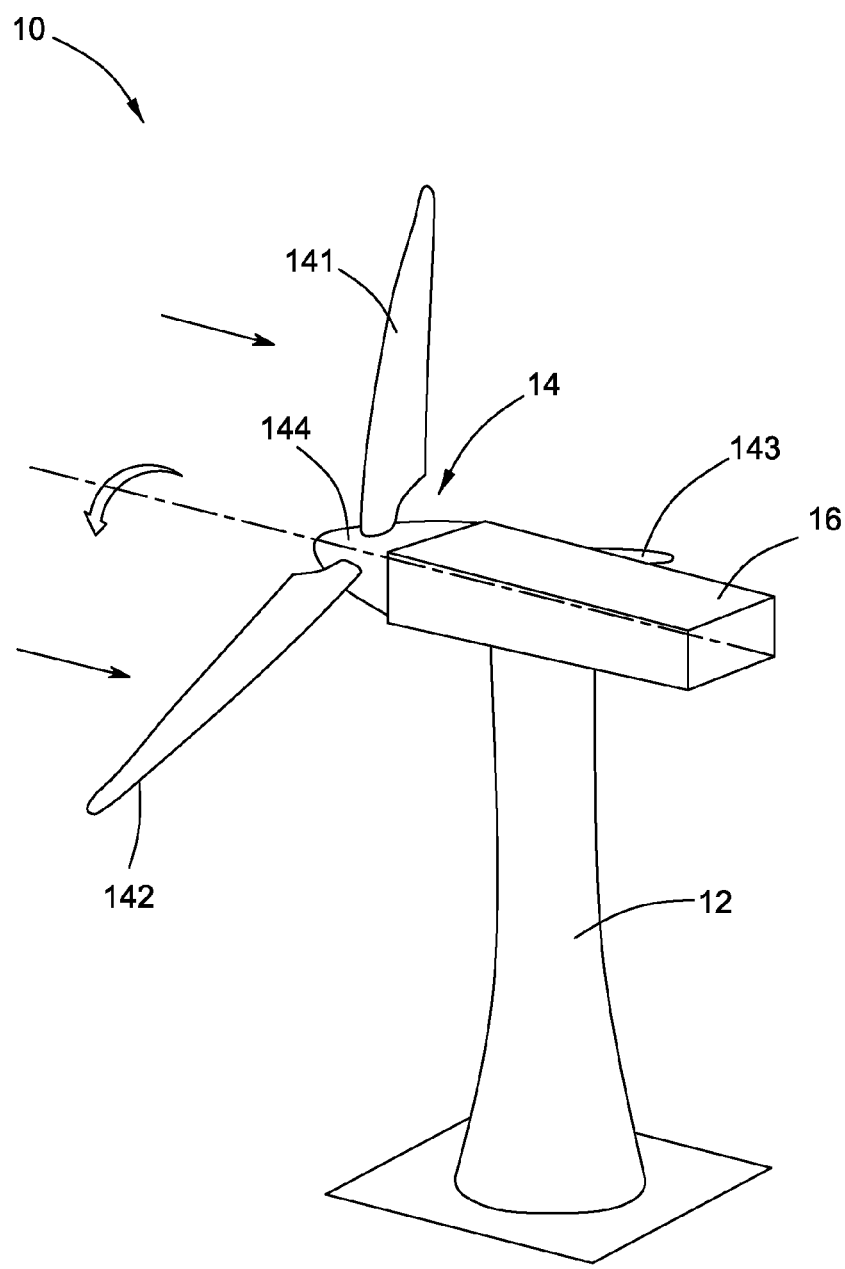
FIG. 1 is a schematic view of a wind turbine according to one embodiment.

Referring to FIG. 1, a schematic view of an exemplary wind turbine 10 is shown. The wind turbine 10 may include a tower section 12 and a rotor 14. The rotor 14 may include some blades such as three blades 141, 142, and 143 connected to a hub 144. The blades 141, 142, and 143 may rotate with wind energy, and the rotor 14 may transfer that energy to a main shaft (not shown) situated within a nacelle 16. The nacelle 16 may optionally include a drive train (not shown), which may connect the main shaft on one end to one or more generators (not shown) on the other end. Alternatively, the generator(s) may be connected directly to the main shaft in a direct drive configuration. The generator(s) may generate power, which may be transmitted through the tower section 12 to a power distribution panel (PDP) and a pad mount transformer (PMT) for transmission to a grid (not shown). The nacelle 16 may be positioned on a yaw system, which may pivot about a vertical axis to orient the wind turbine 10 in the direction of the wind current. In other embodiments, the wind turbine 10 may comprise a different type of wind turbine.

Figure 2:
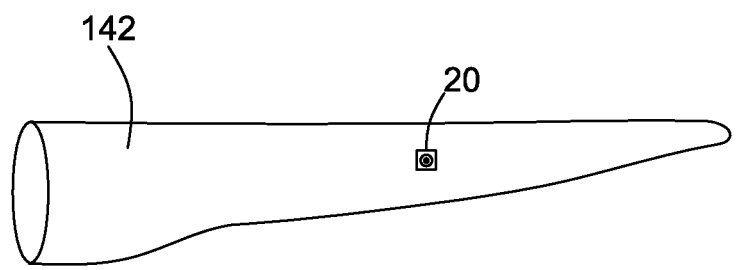
FIG. 2 is a schematic view of a blade of the wind turbine of FIG. 1 according to one embodiment.

Referring to FIG. 2, a schematic view of a blade 142 of the wind turbine 10 of FIG. 1 is shown for purposes of example. In the illustrated embodiment of FIG. 2, the blade 142 includes a Micro Inertial Measurement Unit (MIMU) 20 mounted on an external wall of the blade 142. In other embodiments, the MIMU 20 can be mounted on an inner wall of the blade 142, or the MIMU 20 can be embedded in the wall of the blade 142. One or more MIMUs may be mounted or embedded in each blade. In some embodiments, the number and the positions of the MIMUs 20 can be adjusted according to design requirements or for desired results. For example, the blade 142 can include three or more MIMUs 20 mounted at different positions thereof. In other embodiments, other parts of the wind turbine 10, such as the tower section 12 and the nacelle 16 may also include MIMUs 20 to provide parameter signals as necessary.

Figure 3:
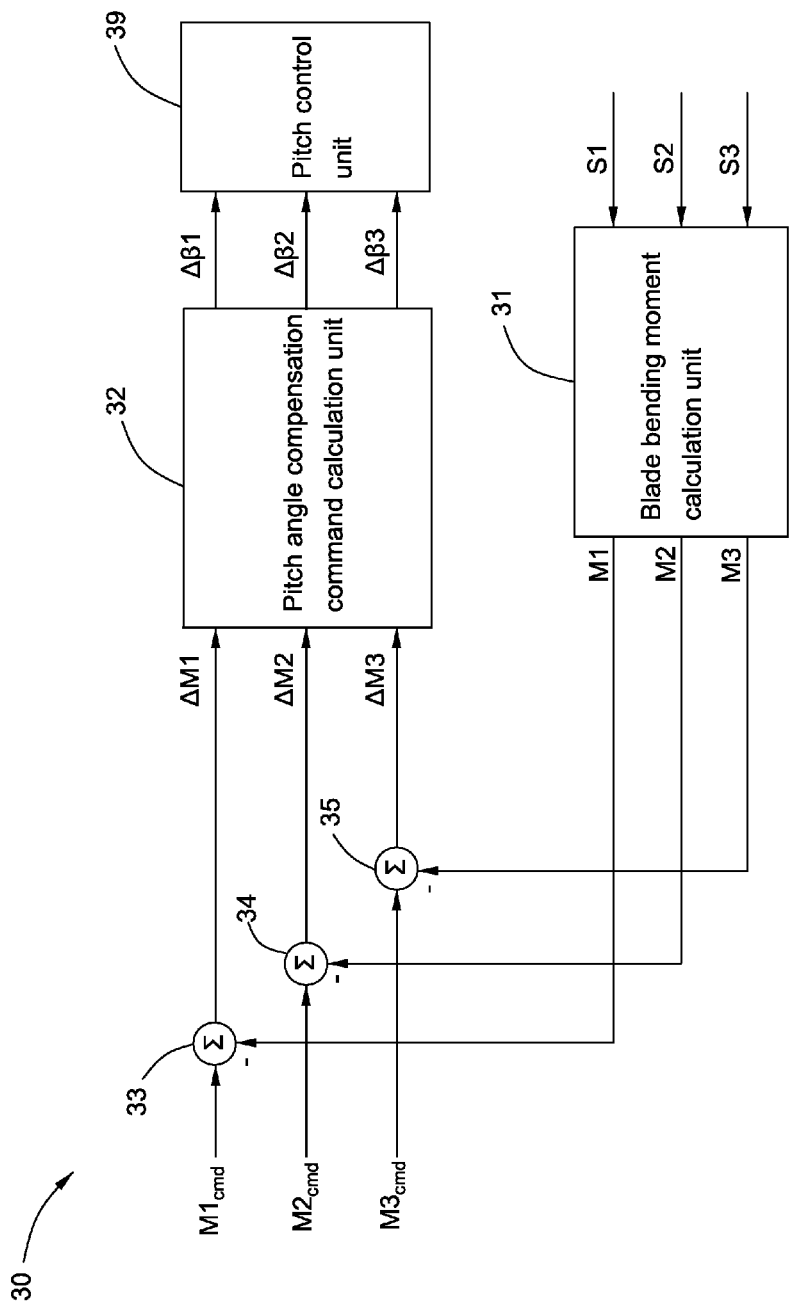
FIG. 3 is a control diagram of a control system of the wind turbine of FIG. 1, according to one embodiment.

Referring to FIG. 3, a control diagram of a control system 30 of the wind turbine 10, according to one embodiment is shown. In at least some embodiments, the control system 30 includes a blade bending moment calculation unit 31, a pitch angle compensation command calculation unit 32, a first summation element 33, a second summation element 34, and a third summation element 35.

The blade bending moment calculation unit 31 is used to receive parameter signals sensed from the MIMUs 20 of the blades 141, 142, and 143 respectively. Based on one or more of the received parameter signals which may comprise, for example, one or more blade deformation slope signals, blade acceleration signals, pitch angle signals, and rotor position signals, or combinations thereof (shown as S1, S2, S3 respectively corresponding to the blades 141, 142, 143), the blade bending moment calculation unit 31 can calculate blade bending moment values M1, M2, M3 of the three blades 141, 142, and 143 respectively. Exemplary embodiments of calculating the blade bending moment values M1, M2, M3 will be described in further detail to follow.

In the illustrated embodiment of FIG. 3, the first summation element 33 subtracts the calculated blade bending moment value M1 from a blade bending moment command $M1_{cmd}$ and provides a blade bending moment error signal $\Delta M1$ representing a difference between the blade bending moment command $M1_{cmd}$ and the calculated blade bending moment value M1. The blade bending moment $M1_{cmd}$ represents the desired blade bending moment to be generated on the blade 141 and may be dictated by a grid operator or a design parameter, such as zero kNm, for example. Similarly, the second summation element 34 subtracts the calculated blade bending moment value M2 from a blade bending moment command $M2_{cmd}$ and provides a blade bending moment error signal $\Delta M2$ representing a difference between the blade bending moment command $M2_{cmd}$ and the calculated blade bending moment value M2. The third summation element 35 subtracts the calculated blade bending moment value M3 from a blade bending moment command $M3_{cmd}$ and provides a blade bending moment error signal $\Delta M3$ representing a difference between the blade bending moment command $M3_{cmd}$ and the calculated blade bending moment value M3. In this illustrated embodiment of FIG. 3, the summation elements 33, 34, 35 act as a blade bending moment error signal calculation unit to calculate the blade bending moment error signals $\Delta M1$, $\Delta M2$, and $\Delta M3$. In other embodiments, the blade bending moment error signal calculation unit can use other types of elements, such as using a processor to calculate the three blade bending moment error signals $\Delta M1$, $\Delta M2$, and $\Delta M3$.

The pitch angle compensation command calculation unit 32 then receives the rotor imbalance information, namely the three blade bending moment error signals $\Delta M1$, $\Delta M2$, and $\Delta M3$, and then respectively calculates three pitch angle compensation commands $\Delta\beta1$, $\Delta\beta2$, and $\Delta\beta3$. The pitch angle compensation commands $\Delta\beta1$, $\Delta\beta2$, and $\Delta\beta3$ are used to adjust pitch angles of the three blades 141, 142, and 143 respectively, to compensate the rotor imbalance thereof. Furthermore, because the MIMUs 20 may sense the parameters more quickly than any other sensors installed at other locations such as the main shaft or drive train components, the pitch angle compensation commands $\Delta\beta1$, $\Delta\beta2$, and $\Delta\beta3$ may more quickly mitigate the rotor imbalance. In addition to mitigating the rotor imbalance, the pitch angle compensation commands $\Delta\beta1$, $\Delta\beta2$, and $\Delta\beta3$ also may mitigate extreme loads on the blades 141, 142, 143, such as sudden high wind gust and sudden grid failure, to protect the wind turbine 10 as well.

It should be understood that, the pitch angle compensation commands $\Delta\beta1$, $\Delta\beta2$, and $\Delta\beta3$ are transmitted to a pitch control unit 39 used to adjust the pitch angles of the three blades 141, 142, and 143. The pitch angle compensation command calculation unit 32 may transform the three blade bending moment error signals $\Delta M1$, $\Delta M2$, and $\Delta M3$ into the pitch angle compensation commands $\Delta\beta1$, $\Delta\beta2$, and $\Delta\beta3$ by any appropriate algorithm based on wind turbine technology.

In the illustrated embodiment of FIG. 3, the calculated blade bending moment values M1, M2, M3 are calculated in a three phase coordinate system, such as an abc coordinate system, which may require complex calculations. For simplifying the calculations, the calculated blade bending moment values M1, M2, M3 may be calculated in other coordinate systems such as, for examples a two phase coordinate system, such as a d-q coordinate system.

Figure 4:
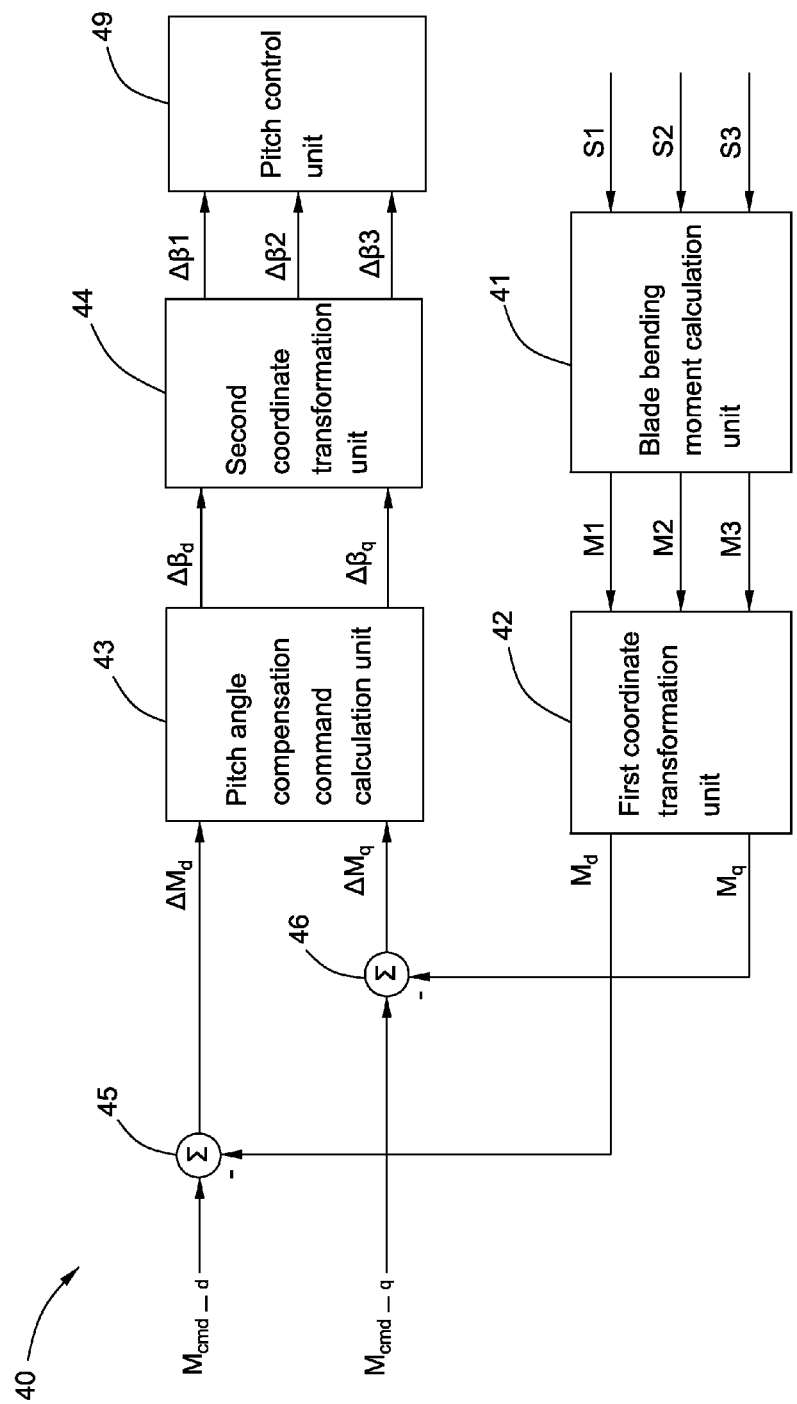
FIG. 4 is a control diagram of a control system of the wind turbine of FIG. 1, according to another embodiment.

Referring to FIG. 4, a control diagram of a control system 40 of the wind turbine 10, according to another embodiment is shown. The difference between this embodiment of FIG. 4 and the above embodiment of FIG. 3 is that the embodiment of FIG. 4 obtains the calculated blade bending moment values M1, M2, M3 in d-q coordinates. The control system 40 includes a blade bending moment calculation unit 41, a first coordinate transformation unit 42, a pitch angle compensation command calculation unit 43, a second coordinate transformation unit 44, and two summation elements 45, 46. The blade bending moment calculation unit 41, the pitch angle compensation command calculation unit 43, and the summation elements 45, 46 have similar functions as the blade bending moment calculation unit 31, the pitch angle compensation command calculation unit 33, and the summation elements 34-36 respectively of FIG. 3.

In the control system 40 of FIG. 4, the first coordinate transformation unit 42 is used to transform the calculated blade bending moment values M1, M2, M3 from abc coordinates into d-q coordinates, namely transform them to two blade bending moment values $M_d$ and $M_q$. Then two blade bending moment error signals $\Delta M_d$, $\Delta M_q$ are obtained through the summation elements 45, 46 based on two predetermined blade bending moment commands $M_{cmd\_d}$ and $M_{cmd\_q}$. The two blade bending moment error signals $\Delta M_d$, $\Delta M_q$ are transformed into two corresponding pitch angle compensation commands $\Delta \beta_d$ and $\Delta \beta_q$ which are then transformed into three pitch angle compensation commands $\Delta \beta 1$, $\Delta \beta 2$, and $\Delta \beta 3$ through the second coordinate transformation unit 44. The pitch angle compensation commands $\Delta \beta 1$, $\Delta \beta 2$, and $\Delta \beta 3$ are transmitted to a pitch control unit 49 (similar to the pitch control unit 39) used to adjust the pitch angles of the three blades 141, 142, and 143. In one embodiment, the formulas for transforming M1, M2, M3 to $M_d$, $M_q$ and for transforming $\Delta \beta_d$, $\Delta \beta_q$ to $\Delta \beta 1$, $\Delta \beta 2$, and $\Delta \beta 3$ can be written as follows, wherein $\theta$ stands for rotor position.

$$\begin{pmatrix} Md \\ Mq \end{pmatrix} = \begin{pmatrix} \cos\theta & \cos\left(\theta + \frac{2\pi}{3}\right) & \cos\left(\theta + \frac{4\pi}{3}\right) \\ \sin\theta & \sin\left(\theta + \frac{2\pi}{3}\right) & \sin\left(\theta + \frac{4\pi}{3}\right) \end{pmatrix} \begin{pmatrix} M1 \\ M2 \\ M3 \end{pmatrix}$$

$$\begin{pmatrix} \Delta\beta d \\ \Delta\beta q \end{pmatrix} = \begin{pmatrix} \cos\theta & \cos\left(\theta + \frac{2\pi}{3}\right) & \cos\left(\theta + \frac{4\pi}{3}\right) \\ \sin\theta & \sin\left(\theta + \frac{2\pi}{3}\right) & \sin\left(\theta + \frac{4\pi}{3}\right) \end{pmatrix} \begin{pmatrix} \Delta\beta 1 \\ \Delta\beta 2 \\ \Delta\beta 3 \end{pmatrix}.$$

Figure 5:
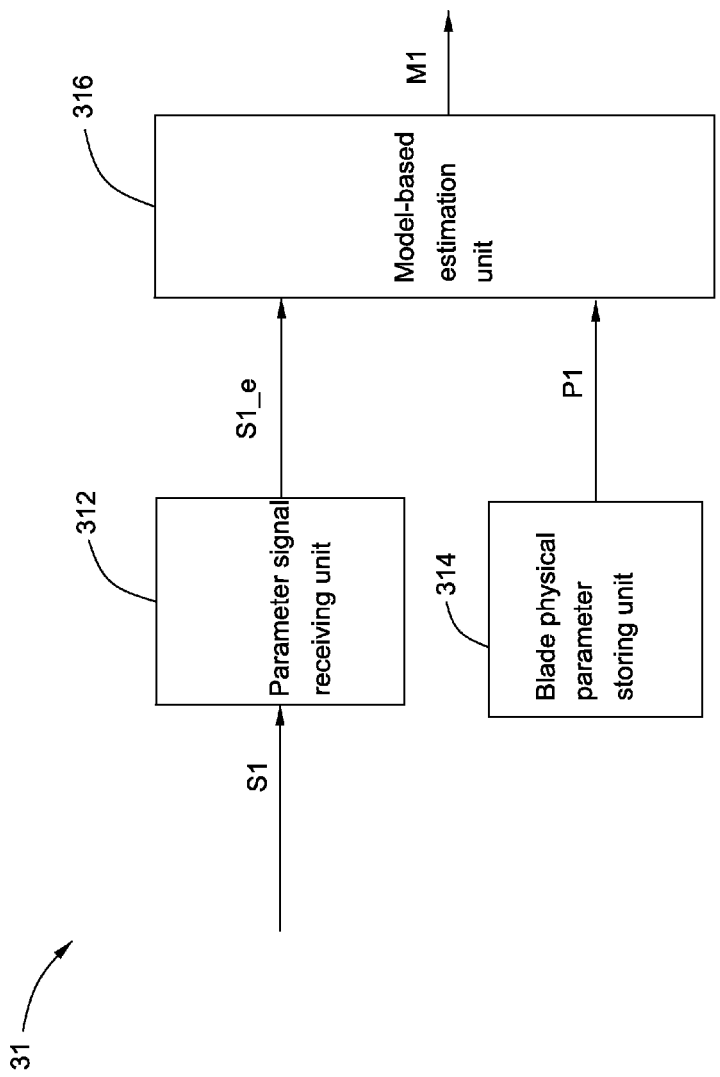
FIG. 5 is a partial diagram of a blade bending moment calculation unit of the control system of FIG. 3, according to one embodiment.

Referring to FIG. 5, a partial diagram of the blade bending moment calculation unit 31 of the control system 30 of FIG. 3 according to one embodiment is shown. The blade bending moment calculation unit 31 includes a parameter signal receiving unit 312, a blade physical parameter storing unit 314, and a model-based estimation unit 316. The parameter signal receiving unit 312 is used to receive sensed parameter signals S1 from the MIMU 20 of the blade 141; the blade physical parameter storing unit 314 is used to store some blade physical parameters P1 of the blade 141; the model-based estimation unit 316 is used to calculate the blade bending moment value M1 of the blade 141 based on one or more selected sensed parameter signals S1_e and one or more of the prestored blade physical parameters P1 by using at least one model-based estimation algorithm. In some embodiments, the blade physical parameters P1 may be not used at all, and thus the blade physical parameter storing unit 314 is omitted accordingly. The blade bending moment values M2 and M3 for blades 142 and 143 may be calculated in a similar manner.

Figure 6:
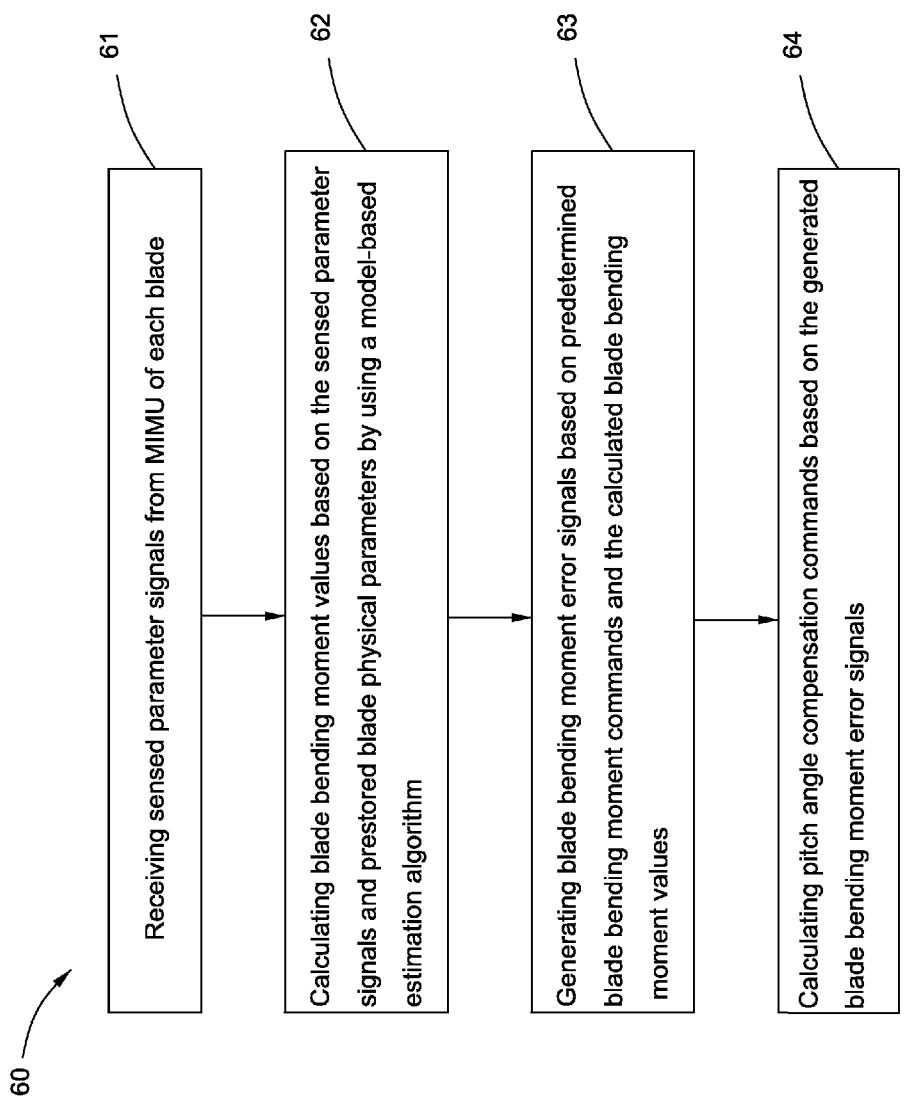
FIG. 6 is a flowchart of a control method of the wind turbine of FIG. 1, according to one embodiment.

Referring to FIG. 6, a flowchart of an exemplary wind turbine control method 60 is shown. In at least some embodiments, the control system 30 of FIG. 3 uses this control method 60 to perform the rotor imbalance compensation process. In step 61, the parameter signals of each of the blades 141, 142, and 143 are received from the corresponding MIMUs 20. In step 62, the blade bending moment values M1, M2, M3 of each of the blades 141, 142, and 143 are calculated based on one or more of the sensed parameter signals S1_e and one or more of prestored blade physical parameters P1 by using at least one model-based estimation algorithm. In step 63, three blade bending moment error signals $\Delta$M1, $\Delta$M2, $\Delta$M3 respectively corresponding to the blades 141, 142, 143 are generated based on the calculated blade bending moment values M1, M2, M3 and three predetermined blade bending moment commands M1$_{cmd}$, M2$_{cmd}$, M3$_{cmd}$. In step 64, three pitch angle compensation commands $\Delta\beta$1, $\Delta\beta$2, and $\Delta\beta$3 respectively corresponding to the blades 141, 142, 143 are calculated based on the generated blade bending moment error signals $\Delta$M1, $\Delta$M2, $\Delta$M3.

As mentioned above, the model-based estimation unit 316 of FIG. 5 stores at least one model-based estimation algorithm (or transfer function) used to calculate the blade bending moment values M1, M2, M3. It should be appreciated that the model-based estimation algorithms are configured based on the characteristics of the blade bending moment parameters on the blade of the wind turbine. Two exemplary embodiments of the model-based estimation algorithms will be described in further detail with respect to FIGS. 7 and 8.

Figure 7:
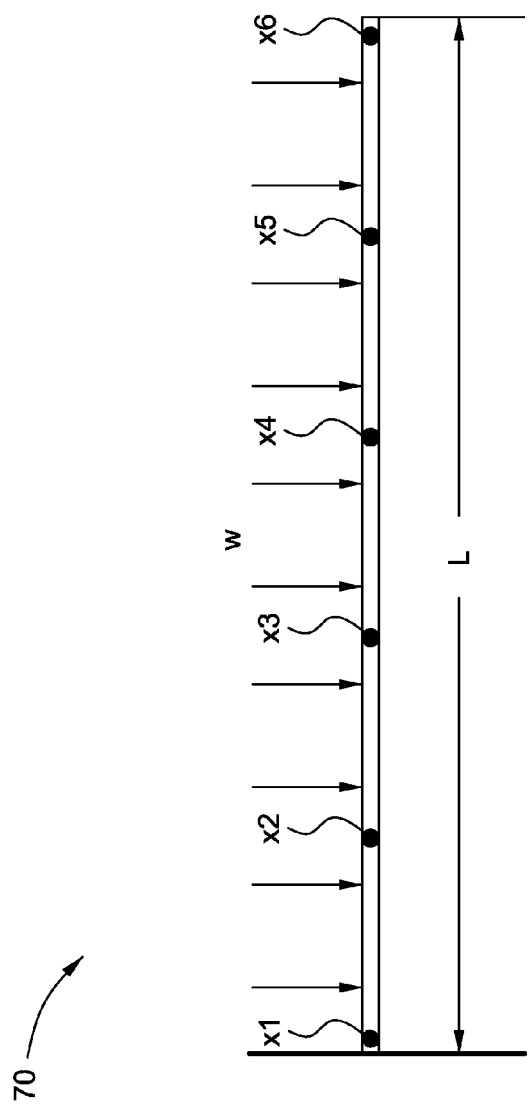
FIG. 7 is a schematic view of a physics-based model using in a model-based estimation unit of the control system of FIG. 3 according to one embodiment.

Referring to FIG. 7, a schematic view of a physics-based model using is shown. In illustrated embodiment of FIG. 7, the physics-based model comprises an Euler beam model using an Euler beam 70 to simulate each of the blades 141, 142, and 143. Here, the flap-wise load distribution on the Euler beam 70 is assumed to be uniform, symbolized as 'w'. The flap-wise force F and the flap-wise bending moment M can be calculated according to the following two equations: F=w(L-x); M=w/2($x^2$-2Lx+$L^2$), wherein L is the length of the Euler beam 70 and x stands for blade positions, such as x1, x2, x3, x4, x5, x6 shown in FIG. 7. For example, if a root bending moment needs to be calculated, x is the x1 shown in FIG. 7. Here, only the flap-wise bending moment is calculated, and the other two orientations of bending moments (namely edgewise bending moment and pitch bending moment) are omitted due to the two bending moments being very small. In other embodiments, the other parts of bending moments may also be calculated in the physics-based model in order to increase accuracy.

The flap-wise load distribution 'w' can be obtained from the MIMU 20 directly or calculated based on some related parameter signals, such as blade deformation slope, from the MIMU 20 and some prestored blade physical parameters. The length L of the Euler beam 70 can be prestored in the blade physical parameter storing unit 314. The advantage of this Euler beam model is that the model is simple and straightforward. In other embodiments, the model-based estimation unit 316 can use other types of theoretical physical beam models to calculate the bending moment values. For example, the physical models can be a two-dimensional or three-dimensional model, and the applied model can obtain sufficient parameter signals from the MIMU 20 and blade physical parameters from the blade physical parameter storing unit 314 to calculate the bending moments based on suitable algorithms.

Figure 8:
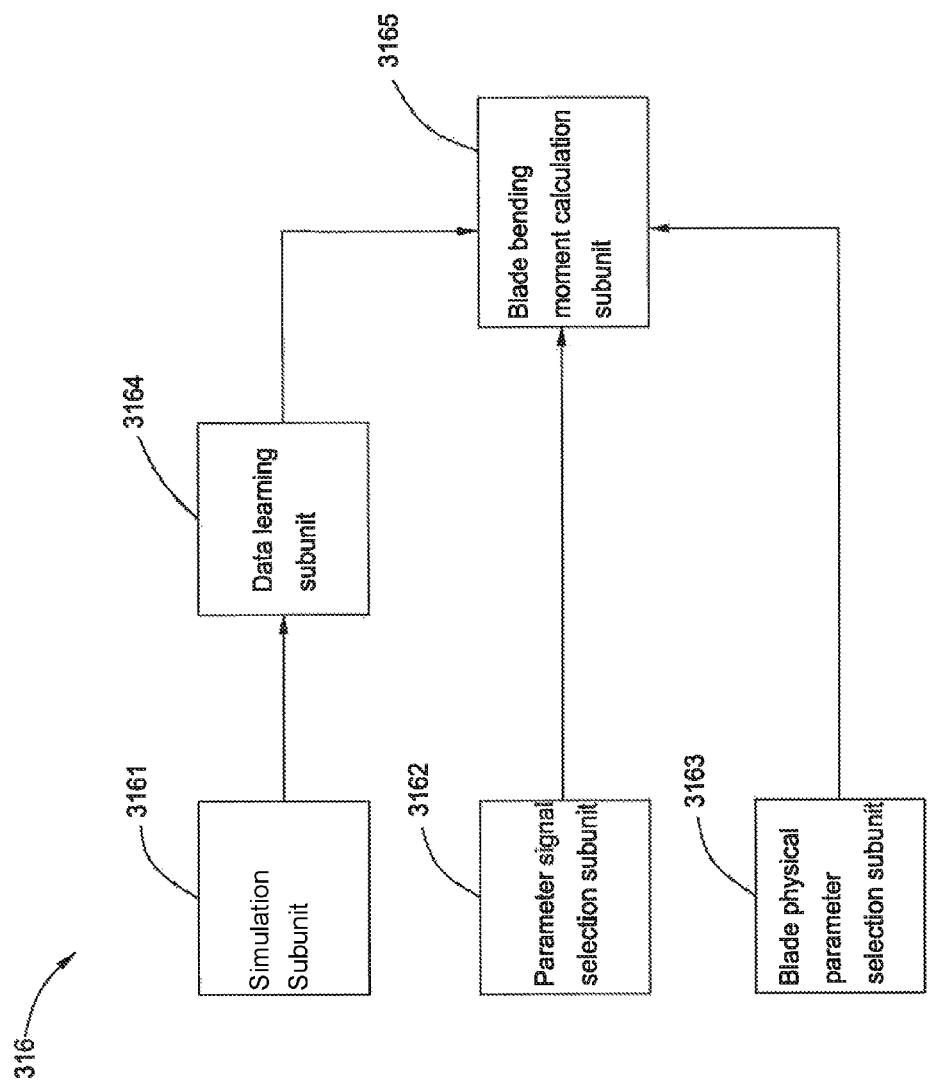
FIG. 8 is a detailed diagram of a model-based estimation unit of the blade bending moment calculation unit of FIG. 5 according to one embodiment.

In another embodiment, the mathematical model programmed in the model-based estimation unit 316 may comprise a data-driven model or a hybrid model such as a combination of both physics-based and data-driven models. Referring to FIG. 8, a detailed diagram of another model-based estimation unit 316 is shown. In at least some embodiments, the model-based estimation unit 316 applies a hybrid model and includes a simulation subunit 3161, a parameter signal selection subunit 3162, a blade physical parameter selection subunit 3163, a data learning subunit 3164, and a blade bending moment calculation subunit 3165.

The simulation subunit 3161 is used to simulate the blades 141, 142, 143 of the wind turbine 10 by using simulation software, such as FlexSim simulation software available from FlexSim Software Products, Inc. The data learning subunit 3164 is used to extract a blade bending moment simulation value and at least one related parameter simulation signal based on the wind turbine model simulated in the simulation subunit 3161 and to calculate the relationship between the blade bending moment simulation value and the related parameter simulation signals. The related parameter simulation signals correspond to one or more parameter signals sensed by the MIMU 20 or to preprocessed data of one or more parameter signals sensed by the MIMU 20. The calculated relationship is then supplied to the blade bending moment calculation subunit 3165.

The parameter signal selection subunit 3162 is used to obtain parameter signals S1_e corresponding to the related parameter simulation signals from the parameter signal receiving unit 312. The blade physical parameter selection subunit 3163 is used to obtain blade physical parameters P1 related to the relationship between the blade bending moment simulation value and the related parameter simulation signals. In some embodiments, the blade physical parameter selection subunit 3163 may be omitted if the relationship between the blade bending moment simulation value and the related parameter simulation signals can be determined without any blade physical parameter information. When the blade physical parameter selection subunit 3163 is omitted, the hybrid model becomes an individual data-driven mathematical model. Because the MIMUs 20 can sense multiple types of parameter signals S1, the parameter signal selection subunit 3162 can select required parameter signals S1_e according to the related parameter simulation signals.

The blade bending moment calculation subunit 3165 obtains the calculated relationship between the blade bending moment simulation value and the related parameter simulation signals from the data learning parameters generation subunit 3164. The blade bending moment calculation subunit 3165 applies this calculated relationship to obtain real blade bending moment values (M1, M2, M3) based on received real parameter signals from the MIMU 20 and the real blade physical parameters prestored in the blade physical parameter storing unit 314.

For example, the data learning subunit 3164 may calculate a simulated load distribution w and a simulated blade deformation slope α by using Fast Fourier Transform (FFT) spectra analysis based on the wind turbine model in the simulation subunit 3161. The simulated load distribution w is related to the blade bending moment simulation value, and the simulated blade deformation slope α is related to the at least one related parameter simulation signal (blade deformation slope signal). The simulated load distribution w and the simulated blade deformation slope α can be written as:

$$w = A\_w \sin \phi + b\_w;$$

$$\alpha = A\_\alpha \sin \phi + b\_\alpha.$$

Wherein ϕ stands for blade rotor position. From analysis, b_α has the polynomial relationship with A_w and b_w, which can be written as:

$$A\_w = C_1 * b\_\alpha;$$

$$b\_w = C_2 * b\_\alpha.$$

Then, two coefficients $C_1$ and $C_2$ are calculated accordingly.

After data learning, the relationship ($C_1$ and $C_2$) between the load distribution w and the blade deformation slope α may be determined. Then, the blade bending moment calculation subunit 3165 may obtain real blade deformation slope α', and the real load distribution w' can be calculated based on the above four equations. Namely, w'=A_w' sin ϕ'+b_w'=$C_1$*b_α' sin ϕ'+$C_2$*b_α'. Because the two coefficients $C_1$ and $C_2$ are determined in the data learning subunit 3164, and the real parameter signals of blade deformation slope b_α' and blade rotor position ϕ' can be obtained from the MIMUs 20, the real load distribution w' is determined accordingly. Then the blade bending moment M' can be calculated according to the load distribution w' based on blade bending moment calculation formula. For example, M'=ΣF'*ΔL; F'=Σw'*ΔL, where F stands for blade flap-wise force, and L stands for blade span length. The blade physical parameter L can be obtained from the blade physical parameter storing unit 314. In other embodiments, the blade physical parameters may further include blade mass and blade stiffness for example, in order to increase its accuracy.

Figure 9:
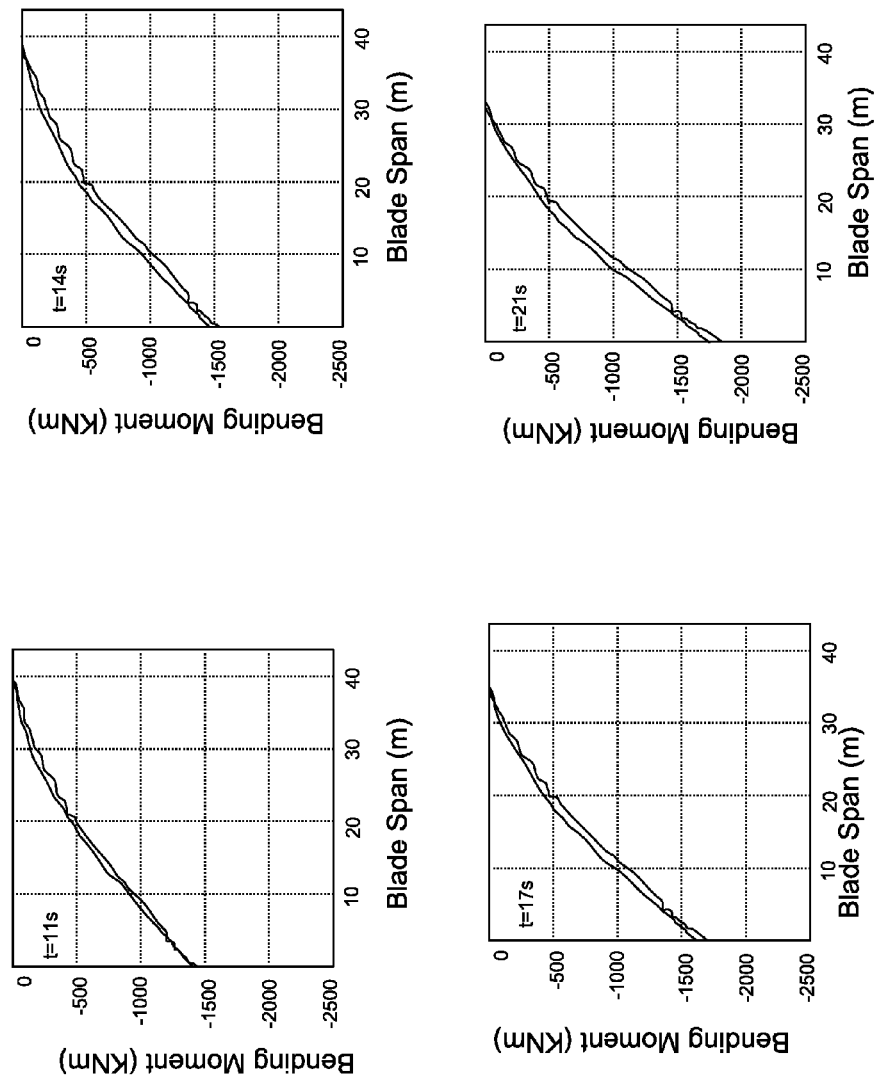
FIG. 9 are four comparison diagrams of calculated blade bending moment values and simulated blade bending moment values with different time ranges.

It should be appreciated that the mathematical model utilized by the model-based estimation unit 316 may be validated and/or calibrated prior to being stored within the model-based estimation unit. For example, FIG. 9 shows four comparison diagrams of calculated blade bending moment values and simulated blade bending moment values with different time ranges for example 11 s, 14 s, 17 s, and 21 s, which are used to validate and/or calibrate the mathematical model programmed in the model-based estimation unit 316 of FIG. 8. In these four comparison diagrams, the calculated blade bending moment values have common trends with the simulated blade bending moment values (see the two curves in each comparison diagram of FIG. 9), which can validate and/or calibrate the mathematical model programmed in the model-based estimation unit 316 is suitable to calculate the blade bending moment values M1, M2, and M3.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A control method for mitigating rotor imbalance on a plurality of blades of a wind turbine, the method comprising:
   sensing parameter signals of the plurality of blades through a plurality of Micro Inertial Measurement Units (MIMUs), wherein at least one of the MIMUs is physically configured on each of the blades such that the signals from the MIMUs are in response to one or more real-time actual physical conditions induced on the blades;
   calculating blade bending moment values of the plurality of blades based at least on the sensed parameters;
   calculating blade bending moment error signals of the plurality of blades based on the calculated blade bending moment values of the plurality of blades and a plurality of blade bending moment commands;
   calculating pitch angle compensation commands of the plurality of blades based on the calculated blade bending moment error signals; and
   using the pitch angle compensation commands to adjust pitch angles of the plurality of blades to compensate for the real-time bending moments induced on the blades as sensed by the MIMUs.

2. The method of claim 1, wherein calculating each of the blade bending moment error signals comprises subtracting a calculated blade bending moment value from a corresponding blade bending moment command and providing a blade bending moment error signal.

3. The method of claim 2, wherein the calculated blade bending moment values are calculated in a two phase coordinate system transformed from a three phase coordinate system.

4. The method of claim 1, wherein calculating blade bending moment values of the plurality of blades based at least on the sensed parameters comprises:
   receiving sensed parameter signals from the plurality of MIMUs; and
   calculating the blade bending moment values of the plurality of blades based on the sensed parameters by using a model-based estimation algorithm.

5. The method of claim 4, wherein calculating blade bending moment values of the plurality of blades based at least on the sensed parameters further comprises:
   storing blade physical parameters of the plurality of blades applied in the model-based estimation algorithm.

6. The method of claim 4, wherein the model-based estimation algorithm comprises a physics-based mathematical model.

7. The method of claim 6, wherein the physics-based mathematical model comprises a theoretical physics model used to simulate each of the plurality of blades.

8. The method of claim 4, wherein calculating the blade bending moment values of the plurality of blades based on the sensed parameters by using a model-based estimation algorithm comprises:
   simulating the plurality of blades of the wind turbine;
   extracting a blade bending moment simulation value and at least one related parameter simulation signal based on the simulated wind turbine model;
   calculating the relationship between the blade bending moment simulation value and the at least one related parameter simulation signal;
   obtaining parameter signals corresponding to the at least one related parameter simulation signal; and
   calculating the blade bending moment values of the plurality of blades based on the obtained parameter signals and the calculated relationship between the blade bending moment simulation value and the at least one related parameter simulation signal.

9. The method of claim 5, wherein calculating the blade bending moment values of the plurality of blades based on the sensed parameters by using a model-based estimation algorithm comprises:
   simulating the plurality of blades of the wind turbine;
   extracting a blade bending moment simulation value and at least one related parameter simulation signal based on the simulated wind turbine model;
   calculating the relationship between the blade bending moment simulation value and the at least one related parameter simulation signal;
   obtaining parameter signals corresponding to the at least one related parameter simulation signal;
   obtaining one or more blade physical parameters related to the relationship between the blade bending moment simulation value and the at least one related parameter simulation signal; and
   calculating the blade bending moment values of the plurality of blades based on the obtained parameter signals, the obtained one or more blade physical parameters, and the calculated relationship between the blade bending moment simulation value and the at least one related parameter simulation signal.

* * * * *